United States Patent [19]

Allard

[11] 3,929,691

[45] Dec. 30, 1975

[54] SOLUTIONS OF COPOLYMERS CONTAINING AMIDE AND IMIDE GROUPS AND PROCESS FOR THEIR PREPARATION

[75] Inventor: Pierre Allard, Cailloux-sur-Fontaines, France

[73] Assignee: Societe Rhodiaceta, Paris, France

[22] Filed: Dec. 29, 1969

[21] Appl. No.: 888,913

[30] Foreign Application Priority Data
Dec. 30, 1968 France .......................... 68.181,948

[52] U.S. Cl. .......... 260/30.2; 57/140 R; 260/32.6 N; 260/47 CB; 260/63 N; 260/77.5 R; 260/78 TF; 264/184; 264/205
[51] Int. Cl.² ........................................ C08G 73/14
[58] Field of Search ....... 260/47 CZ, 78 TF, 32.6 N, 260/63 N, 77.5 R, 30.2

[56] References Cited
UNITED STATES PATENTS

| | | | |
|---|---|---|---|
| 3,300,420 | 1/1967 | Frey | 260/2.5 |
| 3,314,923 | 4/1967 | Muller et al. | 260/78 |

*Primary Examiner*—Lester L. Lee
*Attorney, Agent, or Firm*—Stevens, Davis, Miller & Mosher

[57] ABSTRACT

The invention provides wet- or dry-spinnable solutions of high molecular weight polyamide-polyimide copolymers derived from an aromatic diisocyanate, an aromatic or heterocyclic diacid, an aromatic anhydride acid and, optionally, an aromatic dianhydride, in polar solvents such as N-methylpyrrolidone.

10 Claims, No Drawings

SOLUTIONS OF COPOLYMERS CONTAINING AMIDE AND IMIDE GROUPS AND PROCESS FOR THEIR PREPARATION

The present invention relates to solutions of high molecular weight copolymers containing both amide and imide groups, and a process for their preparation.

High molecular weight aromatic polyamide-imides derived from tricarboxylic acid derivatives and various processes for their preparation, are known. According to certain of these processes, an aromatic diamine is reacted with a derivative of a tricarboxylic acid, for example, a tricarboxylic acid halide. According to another process, an aromatic diisocyanate and tricarboxylic acid anhydride are reacted in a polar solvent. Aromatic polyamide-imides so obtained are polymers of good heat stability but with insufficient resistance to basic hydrolysis for certain applications.

It is also known to produce aromatic polyamides of high molecular weight by reaction of one or more dicarboxylic acids and one or more organic diisocyanates in solution in a polar solvent. However, the polyamides thus obtained do not show the properties required for certain applications because their solubility is too low to give solutions of high concentration.

According to the present invention, there are provided spinnable high molecular weight solutions of polyamide-polyimide copolymers comprising units of the formulae:

$$-NH-Ar_1-NH-CO-Ar_2-CO-$$

and

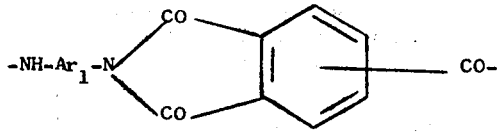

and optionally also of the formula:-

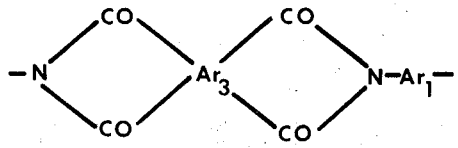

in which $Ar_1$ represents a divalent aromatic radical of formula:

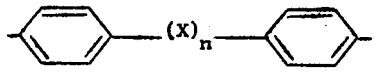

wherein $n = 0$ or $1$ and $X = O$, $SO_2$ or $CH_2$, $Ar_2$ is a divalent aromatic or heterocyclic radical, and $Ar_3$ represents a tetravalent aromatic radical.

Directly spinnable solutions of these copolymers are prepared by reacting, in essentially stoichiometric proportions and in an anhydrous polar solvent a diisocyanate of formula:

$$OCN-Ar_1-NCO$$

wherein $Ar_1$ has the same significance as above, and an aromatic anhydride acid of formula:

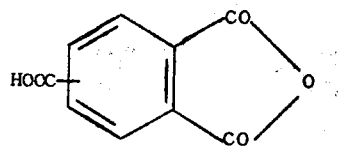

a diacid of formula: $HOOC-Ar_2-COOH$, (wherein $Ar_2$ has the same significance as above) and optionally 5 to 30 mole % of a dianhydride of formula:

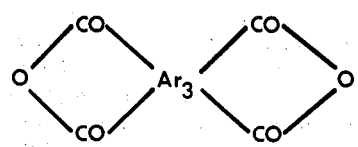

relative to the mixture of anhydride acid, diacid, and dianhydride, the temperature being progressively raised during the reaction.

To shape the copolymer solutions, the solvent may be removed by a dry spinning or wet spinning technique.

If desired, an aliphatic or cycloaliphatic diisocyanate may be added in a proportion of less than 5 mole % to the aromatic diisocyanate when the solution is prepared, so as to improve certain properties such as the solubility of the finished product and the flexibility and elasticity of the shaped articles.

As the anhydride acid, trimellitic anhydride is preferably used and as the optional dianhydride, the dianhydrides of the following acids: pyromellitic acid, naphthalene-2,3,6,7-tetracarboxylic acid, perylene-3,4,9,10-tetracarboxylic acid and benzophenone-3,4,3',4'-tetracarboxylic acid.

Among the diacids, terephthalic acid or isophthalic acid are preferably used, the proportion of the diacid in the mixture being between 5 and 60 mol %, preferably 10 to 40 mol %, relative to the mixture of anhydride acid, diacid, and dianhydride (if any).

Solvents which are well suited to carrying out the process of the invention are polar solvents such as N-methylpyrrolidone, dimethylformamide, dimethylacetamide, and hexamethylphosphoryltriamide. To obtain high molecular weight polymers, it is essential to run the reaction in anhydrous polar solvent; that is, containing less than 3000 ppm of residual water, and preferably 100 to 1000 ppm of water.

The working procedure for the manufacture of the solutions consists of raising the temperature during the reaction from 25° to 100°C. at the start of the reaction up to 120°–250°C. at the finish, preferably with a temperature rise of about 10°C. per unit of time, this unit varying from 10 minutes to 1 hour. The temperature may be varied continuously or discontinuously.

According to a preferred version of the process described, solutions of copolymers possessing high inherent viscosities and containing more than 50% of trimellitic units are prepared. Preferably, these units amount to between 60 and 90% of the total number of units.

The copolymers of the present invention are essentially linear and have excellent solubility at high concentrations. They furthermore have the advantage of employing starting materials which are accessible without complicating the process of preparation.

It is also possible to obtain slightly crosslinked compositions by adding about 1.5 to 3 mole % of a triisocyanate such as for example triisocyanatotriphenylthiophosphate, to the monomers.

The copolymers of the present invention yield heat-stable yarns possessing a high tensile strength, and possessing other valuable properties, especially a high flexural strength, and very good resistance to acid and basic hydrolysis combined with excellent mechanical properties.

The following Examples illustrate the invention. In these Examples, the inherent viscosity of the copolymers is measured using an 0.5% strength solution thereof in N-methylpyrrolidone at 25°C., the absolute viscosity being measured at 25°C. on a viscometer of the Epprecht Type. For a good spinnability by dry- or wet-spinning, the molecular weight of these copolymers must be such, that the said inherent viscosity is comprised between 0.5 and 1.6, and preferably between 0.8 and 1.2. Good conditions to obtain directly said inherent viscosity by said process corresponds to a concentration of reactants such that the solids content of the solution after reaction, is comprised between 18 and 35% by weight, and preferably between 21 and 28% by weight.

EXAMPLE 1.

The following reagents were introduced into a 4 liter glass reactor fitted with a central stirrer, means for flushing the atmosphere therein with nitrogen, and a reflux condenser:

| | | |
|---|---|---|
| 44'-diisocyanatodiphenylmethane | 2 mols | 500 g. |
| trimellitic anhydride | 1 mol | 192 g. |
| isophthalic acid | 1 mol | 166 g. |
| distilled N-methylpyrrolidone (containing 200 ppm of residual water). | | 2,566 g. |

The mixture was heated, with stirring, to 80°C. in an oil bath. The temperature was progressively raised by 10°C. every 20 minutes up to a maximum of 200°C. The process was then finished by heating at 200°C. for 2 hours.

The solution turned brown while its viscosity progressively rose. It was thereafter left to cool in an oil bath at ambient temperature for 15 hours.

After filtering under nitrogen pressure, the solution showed the following characteristics:

| | |
|---|---|
| solids content | 22.60% |
| absolute viscosity | 420 poises |
| inherent viscosity of the polymer in solution | 0.92 |

EXAMPLE 2

The procedure of Example 1 was followed using:

| | | |
|---|---|---|
| 44' diisocyanatodiphenylmethane | 2.20 mols | 550 g. |
| trimellitic anhydride | 1.76 mols | 338 g. |
| terephthalic acid | 0.44 mol | 73 g. |
| distilled N-methylpyrolidone | | 3,069 g. |

The same heating programme as in the preceding Example was employed and on cooling, a solution having the following characteristics was obtained:

| | |
|---|---|
| solids content | 20.6% |
| absolute viscosity | 205 poises |
| inherent visocisty of the polymer in solution | 0.82 |

EXAMPLE 3

The procedure of Example 1 was followed using:

| | | |
|---|---|---|
| 44' diisocyanatodiphenylmethane | 2 mols | 500 g. |
| trimellitic anhydride | 0.8 mol | 153.6 g. |
| terephthalic acid | 0.4 mol | 66.4 g. |
| isophthalic acid | 0.8 mol | 132.8 g. |
| distilled N-methylpyrrolidone | | 2,547 g. |

The same heating programme as in Example 1 was employed and, on cooling, a solution obtained showed the following characteristics:

| | |
|---|---|
| solids content | 22.2% |
| absolute viscosity | 355 poises |
| inherent viscosity of the polymer in solution | 0.90 |

A multi-filament yarn was prepared by wet spinning from the solutions obtained in Examples 1, 2 and 3.

The solution was extruded at ambient temperature through a spinneret with 12 holes into a coagulation bath containing one part of water per one part of N-methylpyrrolidone, by weight.

After drying, the yarn showed the following characteristics:

| | Example 1 | Example 2 | Example 3 |
|---|---|---|---|
| Tensile strength (g/tex) | 12.4 | 15.5 | 12.7 |
| Elongation at break, % | 34 | 12 | 48 |

EXAMPLE 4

The following were introduced, with stirring, into a 10 liter glass reactor fitted with a central stirrer, means of flushing the amosphere therein with nitrogen, a swan-neck followed by a descending condenser, and acetone-solid carbon dioxide traps:

| | | |
|---|---|---|
| 44' diisocyanatodiphenylmethane | 1.1 mols | 275 g. |
| trimellitic anhydride | 0.85 mol | 163.2 g. |
| pyromellitic dianhydride | 0.1 mol | 21.8 g. |
| terephthalic acid | 0.15 mol | 24.9 g. |
| distilled N-methylpyrolidone | | 1,241 g. |

The temperature and pressure were varied as shown in the Table below.

| Time (hours) | T°C | Absolute pressure (mm. Hg) | Absolute viscosity (poises) |
|---|---|---|---|
| 0 | 80 | 100 | |
| 0.30 | 90 | " | |
| 1.0 | 100 | 200 | |
| 1.30 | 110 | " | |
| 2. | 120 | " | |
| 2.30 | 130 | 250 | |
| 3. | 140 | " | |
| 3.30 | 150 | " | |
| 4. | 160 | 400 | |
| 4.30 | 170 | " | |
| 5. | 180 | 500 | |
| 5.30 | 190 | 550 | |
| 6. | 200 | 600 | |
| 6.30 | " | " | 580 |
| 7.30 | " | " | 685 |
| | " | " | Addition of 300 ml of N-methylpyrrolidone |

After cooling, the solution, which was brownish in colour, showed the following characteristics:

| | |
|---|---|
| solids content | 21.17 % |
| absolute viscosity | 550 poises |
| inherent viscosity of the polymer in solution | 1 |

This solution could be used for the manufacture of yarns by wet or dry spining.

EXAMPLE 5

The procedure of Example 4 was followed using:

| | | |
|---|---|---|
| 44' diisocyanatodiphenylether (99% strength) | 1 mol | 254.5 g. |
| trimellitic anhydride | 0.9 mol | 172.8 g. |
| terephthalic acid | 0.1 mol | 16.6 g. |
| distilled N-methylpyrrolidone | | 1,127 g. |

At the end of the heating, 200 ml. of solvent were added.

After cooling, the brownish solution showed the following characteristics:

| | |
|---|---|
| solids content | 22% |
| absolute viscosity | 3,000 poises |
| inherent viscosity of the polymer in solution | 1.17 |

EXAMPLE 6

The following were introduced into a four liter reactor and reacted in accordance with the method used in Example 4:

| | | |
|---|---|---|
| 44' diisocyanatodiphenylmethane | 2.20 mols | 550 g. |
| trimellitic anhydride | 1.76 mols | 338 g. |
| terephthalic acid | 0.44 mol | 73 g. |
| distilled dimethylacetamide (containing 400 ppm. of residual water) | | 2,100 g. |

The preparation of this copolymer was finished by heating under reflux for 3 hours.

After cooling, the solution showed the following characteristics:

| | |
|---|---|
| solids content | 28.8% |
| absolute viscosity | 210 poises |
| inherent viscosity of the polymer in solution (0.5 % in dimethylacetamide). | 0.58 |

EXAMPLE 7

The procedure of Example 4 was followed using:

| | | |
|---|---|---|
| 44' diisocyanatodiphenylether | 5 mols | 1,260 g. |
| trimellitic anhydride | 4 mols | 768 g. |
| terephthalic acid | 1 mol | 166 g. |
| N-methylpyrrolidone | | 6,404 g. |

After heating in accordance with Example 4 and then allowing to cool, the solution showed the following characteristics:

| | |
|---|---|
| solids content | 20.35% |
| absolute viscosity | 2,280 poises |
| inherent viscosity of the polymer in solution | 1.26 |

This solution was extruded at a temperature of 110°C. through a spinneret with 60 orifices of 0.10 mm. diameter into a dry spinning cell.

The collected yarn, after treatment in vacuo at 24°C. in an oven for 6 hours and stretching in a ratio of 3.8 at a temperature of 350°C., showed the following characteristics:

| | |
|---|---|
| gauge | 169 dtex/60 filaments |
| tensile strength | 61.5 g/tex |
| elongation at break | 5.5% |
| flexural strength | 1,705,000 cycles. |

The flexural strength was measured with apparatus of the type described in the review "Textiles Chimiques" No. 5, 1969 (pp. 273–274), but using a steel wire of about 20 microns diameter, over which the sample to be tested was passed and subjected to a reciprocating movement at an angle of 110°, being held at one end by a clip subjected to a reciprocating movement of 135 cycles/minute, while the other end of the sample carries a load of 0.1 g/dtex. The number of reciprocating movements until the sample broke gives a value which characterised the flexural strength.

EXAMPLE 8

The procedure of Example 1 was followed using:

| | | |
|---|---|---|
| 44' diisocyanatodiphenylether | 1.5 mols | 378 g. |
| trimellitic anhydride | 1.05 mols | 201.6 g. |
| terephthalic acid | 0.225 mol | 37.35 g. |
| isophthalic acid | 0.225 mol | 37.35 g. |
| N-methylpyrrolidone | | 1,749 g. |

After heating and subsequently being allowed to cool, the solution showed the following characteristics:

| | |
|---|---|
| solids content | 20.4 % |
| absolute viscosity | 2,400 poises |
| inherent viscosity of the polymer in solution | 1.30 |

This solution was converted into a yarn extrusion at a temperature of 108°C. through a spinneret having 10 orifices of 0.15 mm. diameter into a drying spinning cell.

The yarn was assembled to have 3 ends and after treating in an oven for 3 hours at 250°C. in vacuo and stretching in a ratio of 3.86 at a temperature of 360°C. shows the following characteristics:

| | |
|---|---|
| gauge | 90 dtex/30 filaments |
| tensile strength | 62.7 g/tex |
| elongation at break | 7% |
| flexural strength | 1,007,000 cycles |
| (measured as described in Example 7) | |

EXAMPLE 9

The following were introduced, with stirring, into a 50 liter reactor fitted with a central stirrer, means for flushing the atmosphere therein with nitrogen, and a reflux condenser:

| | | |
|---|---|---|
| 44' diisocyanatodiphenylmethane | 25 mols | 6,250 g. |
| trimellitic anhydride | 20 mols | 3,840 g. |
| terephthalic acid | 5 mols | 830 g. |
| N-methylpyrrolidone | | 27,614 g. |

After heating and cooling, the solution showed the following characteristics:

| | |
|---|---|
| solids content | 24% |
| absolute viscosity | 2100 poises |
| inherent viscosity of the polymer in solution | 1.03 |

This solution was converted into a yarn by extrusion at a temperature of 112°C. through a spinneret having 60 orifices of 0.10 mm. diameter into a dry spinning cell.

The yarn was assembled to have 8 ends and after treating in an oven for 4 hours at 240°C. under 5 mm. Hg and then stretching in a ratio of 3.5 at a temperature of 340°C. showed the following characteristics:

| | |
|---|---|
| gauge | 1,240 dtex/480 filaments |
| tensile strength | 45.7 g/tex |
| elongation at break | 11.8 % |
| flexural strength | 781,000 cycles | measured as described in Example 7).

I claim:
1. A spinnable solution consisting essentially of a high molecular weight polyamide-polyimide copolymer dissolved in a polar solvent, said copolymer consisting essentially of units of the formulae:

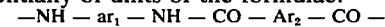

and

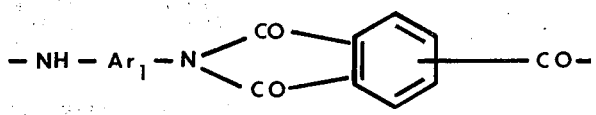

in which $Ar_1$ is a divalent aromatic radical of the formula:

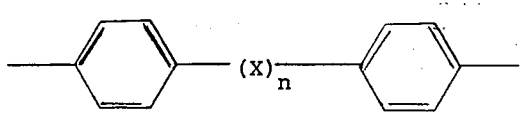

in which $n$ is 0 or 1 and X is $-CH_2-$, $-O-$, or $-SO_2-$, and $Ar_2$ is a divalent aromatic radical, said polar solvent being essentially anhydrous and essentially inert with respect to said copolymer, and said copolymer having an inherent viscosity between 0.5 and 1.6, as measured by using an 0.5% strength solution thereof in N-methylpyrrolidone at 25°C.

2. A spinnable solution according to claim 1, in which $Ar_2$ is m- or p-phenylene or a mixture thereof.

3. A spinnable solution according to claim 1, in which the copolymer contains from 5 to 60 mole % of the units of formula:

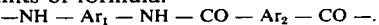

4. A spinnable solution according to claim 1, in which the copolymer has an inherent viscosity between 0.8 and 1.2, as measured by using an 0.5% strength solution thereof in N-methylpyrrolidone at 25°C.

5. A spinnable solution according to claim 1, in which the polar solvent is N-methylpyrrolidone, dimethylformamide or dimethylacetamide.

6. A process for preparing a spinnable solution consisting essentially of the high molecular weight polyamide-polyimide copolymer defined in claim 1, comprising reacting in an anhydrous polar solvent that is essentially inert with respect to said copolymer, reactants in substantially stoichometric proportions that consist essentially of a diisocyanate of formula:

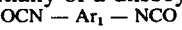

an aromatic anhydride acid of formula:

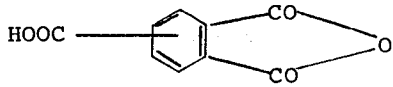

and a diacid of the formula:

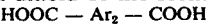

in which $Ar_1$ and $Ar_2$ are as defined in claim 19; the temperature being progressively raised during the reaction from 25° to 100°C at the beginning of the reaction to 120° to 250°C at the end; and the concentration of the reactants being such that the solids content of the solution after reaction is between 18% and 35% by weight.

7. A process according to claim 6, in which the polar solvent contains less than 3000 ppm of residual water.

8. A process according to claim 7, in which the polar solvent contains between 100 and 1000 ppm of residual water.

9. A process according to claim 6, in which the concentration of the reactants is such that the solids content of the solution after reaction is between 18 and 35% by weight.

10. A process according to claim 6, in which said concentration is between 21 and 28% by weight.

* * * * *